Dec. 20, 1966  R. P. ADAMS  3,292,346
GAS DRYING APPARATUS
Filed March 6, 1964  2 Sheets-Sheet 1

INVENTOR
RENARD P. ADAMS

BY Shoemaker and Mattare
ATTORNEYS

Dec. 20, 1966 R. P. ADAMS 3,292,346
GAS DRYING APPARATUS
Filed March 6, 1964 2 Sheets-Sheet 2
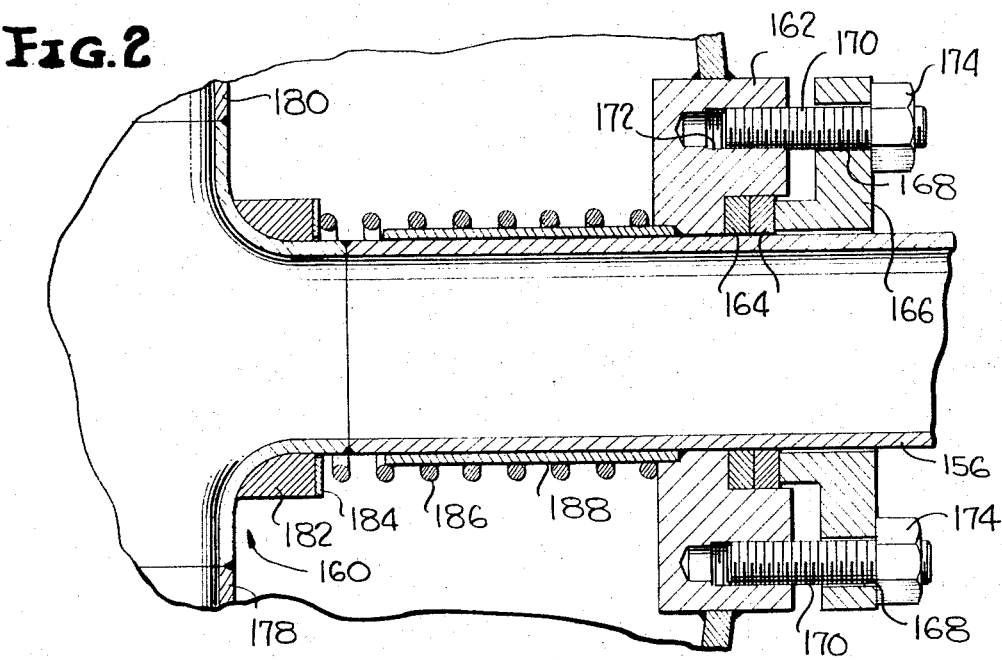
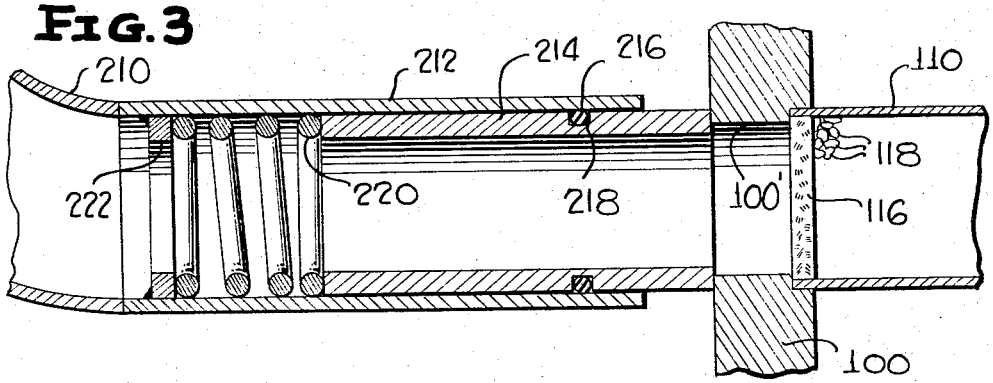
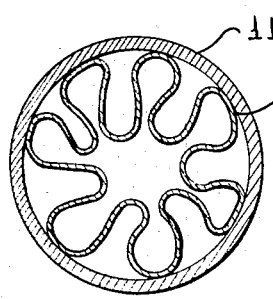
INVENTOR.
RENARD P. ADAMS
BY *Shoemaker and Mattare*
ATTORNEYS

United States Patent Office 3,292,346
Patented Dec. 20, 1966

3,292,346
GAS DRYING APPARATUS
Renard P. Adams, 87 Nottingham Terrace,
Buffalo, N.Y. 14216
Filed Mar. 6, 1964, Ser. No. 349,901
11 Claims. (Cl. 55—180)

The present invention relates to new and novel gas drying apparatus and more particularly to gas drying apparatus especially adapted to be associated with an air compressor and the like.

The present invention is particularly directed to the removal of vapor from the outlet gas of an air compressor. Such outlet gas generally includes the original water vapor content existing at the compressor intake and additionally includes lubricating oil which is vaporized through the heat of compression and passed along with the compressed air. In many instances it is essential to remove as much of this vapor as possible before feeding the compressed air into suitable consuming apparatus.

The present invention employs a combination of elements which provides for a mechanical means to remove the vapor in the form of an aftercooler in combination with a cyclone type separating means, as well as a chemical type vapor removing arrangement in the form of a deliquescent substance which is adapted to chemically remove moisture from gas as it passes along in contact with the deliquescent material.

In the prior art, deliquescent driers have employed cold air discharged therefrom. The efficiency of the present apparatus is increased by heating the discharged gas so as to enlarge the volume of the purified gas to increase the amount of work that can be done by the over-all system. Accordingly, hot dry compressed gas is provided at the outlet of the apparatus of greater volume than would exist from the conventional cold air discharged deliquescent driers.

In the present invention, the hot wet gas coming from an air compressor or the like is firstly passed through a first fluid flow path of a first heat exchanger means. This hot wet gas passes in counterflow through the first heat exchanger means through the cold purified and dry gas which as it flows in counterflow through the first heat exchanger means is heated such that when it passes through the outlet of the first heat exchanger means hot dry air is provided.

The hot wet gas as it passes through the first heat exchanger means will be cooled to a certain extent due to the aforementioned counterflow whereupon it passes into a second heat exchanger means in the form of an aftercooler having a suitable cooling medium such as water passing therethrough. As the wet air passes through the aftercooler or second heat exchanger means, a considerable portion of the vapor will condense.

The outlet of the second heat exchanger means is in turn connected with a cyclone separator which serves to mechanically remove the condensed vapor from the gas.

The gas is then passed to the inlet portion of the drier means. The drier means itself includes a plurality of tubular members through which the gas passes, each of these tubular members having a suitable deliquescent material disposed therewithin for removing still more of the moisture from the gas as it passes therethrough.

After having passed over the deliquescent material, the cold dry air then passes from the outlet portion of the drier means back to a second fluid flow path in the first heat exchanger means and thence to the outlet of the apparatus.

A most important feature of the present invention is the provision of a novel regenerating means for successively and sequentially regenerating the various tubular members of the drying portion of the drier means so as to remove the moisture which has been absorbed by the deliquescent material so as to enable maximum efficiency of operation.

Unique movable portions are provided which are in communication with opposite ends of the tubular members containing the diliquescent material. A first movable portion is connected through an inlet conduit means to the second fluid flow path through the first heat exchanger means preferably adjacent the outlet of the apparatus. With this arrangement, hot dry air is recirculated back from the first heat exchanger means to the movable portion of the regenerating means.

The first movable portion of the regenerating means is moved in such a manner as to successively come into communication with different ones of the tubes containing the deliquescent material. In this manner, the tubes which have accumulated water vapor in the deliquescent material are continuously and orderly regenerated.

The opposite movable end portion in communication with the outlet ends of the tubes containing the deliquescent material is in turn connected with the aftercooler such that the gas after passing through the tubes being regenerated and after having picked up considerable moisture is then recirculated through the aftercooler where such moisture is condensed and thence removed to a large extent by the cyclone separator means.

With this arrangement, the tubes are regenerated without loss of compressed air or without the necessity of providing any outside source of heat or energy in order to accomplish the desired end results. In the present state of the art, the deliquescent material is generally regenerated by providing an external source of electrical energy, steam, or expanding compressed air. In the present arrangement, hot dry gas is recirculated within the apparatus itself which has a much more tremendous drying action on the saturated deliquescent material.

In a practical application of the apparatus according to the present invention, it is contemplated that the structure will probably be in the vicinity of 12 to 15 feet in length and will be built into a compact unit with extremely small horsepower input required. The horsepower required to drive the booster fan utilized for blowing the hot dry gas from the second fluid flow path of the first heat exchanger means into the first movable portion of the regenerating means is very small since only sufficient energy is required for overcoming the friction loss through the apparatus. The horsepower required for rotating the movable portions of the regenerating means is relatively insignificant and for even the largest installations will probably be less than one-half (½) horsepower over-all.

An object of the present invention is to provide new and novel gas drying apparatus which is particularly adapted for use with air compressors and the like for removing water and oil vapor from the hot compressed gas.

Another object of the invention is to provide gas drying apparatus employing combined mechanical and chemical action for removing vapor from gas.

A still further object of the invention is the provision of gas drying apparatus which increases the volume of the purified gas to increase the efficiency of the work done by the over-all system.

Still another object of the invention is to provide gas drying apparatus employing unique regenerating means for the chemical drying substance whereby there is no loss of energy or compressed air within the system and further there is no requirement for an outside source of heat, and wherein the horsepower input to drive certain components of the apparatus is at a minimum.

Yet a further object of the invention is the provision of gas drying apparatus which is quite simple and compact in construction and yet which is reliable and efficient in operation.

Other objects and many attendant advantages of the invention will become more apparent when considered in connection with the specification and accompanying drawings:

FIG. 2 is an enlarged sectional view illustrating the details of construction of a portion of the structure shown in FIG. 1;

FIG. 3 is an enlarged sectional view illustrating a still further constructional detail of the apparatus shown in FIG. 1; and FIG. 4 is a cross-sectional view through a drying tube of the present invention illustrating a modified form of construction.

Figure 1:
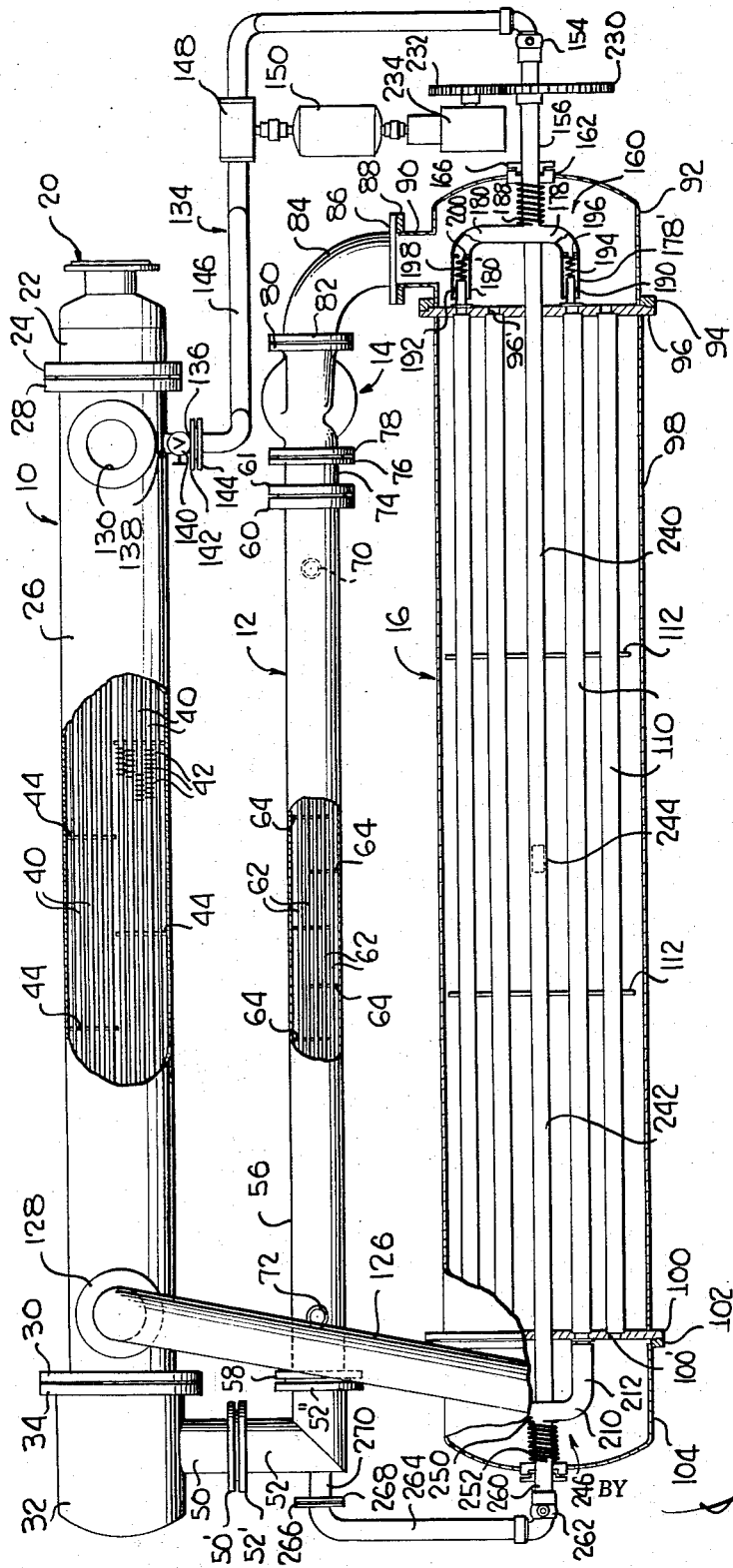
FIG. 1 is a somewhat schematic illustration of the over-all system according to the present invention being shown partially broken away for the sake of clarity.

Referring now to the drawings wherein like reference characters designate corresponding parts throughout the several views, there is shown in FIG. 1 the general layout of the components of the present invention including a first heat exchanger means 10, a second heat exchanger means 12, a separator means indicated generally by reference numeral 14 and a drier means indicated generally by reference numeral 16, these major components of the apparatus being interconnected in a novel manner and including regeneration means for the drier means as hereinafter described.

An inlet portion 20 is adapted to be connected with a suitable conduit means which is in turn in communication with a compressor or the like, the inlet means being connected with a hollow inlet bonnet 22. Bonnet 22 includes a radially extending flange 24.

The first heat exchanger means includes a main cylindrical shell portion 26 having radially extending flanges 28 and 30 disposed at the opposite ends thereof. Suitable means such as nut and bolt assemblies (not shown) are provided for clamping the flanges 24 and 28 together, these flanges serving to clamp a conventional header (not shown) therebetween.

A hollow outlet bonnet 32 is disposed at the opposite end of the first heat exchanger means and includes a radially extending flange 34. Flanges 30 and 34 are suitably clamped together in the usual manner as by nut and bolt assemblies (not shown), and a conventional header (not shown) is clamped between flanges 30 and 34 in the usual manner.

A plurality of tubular members 40 are provided in spaced relationship within the shell 26, these tubular members being open at the opposite ends thereof and being disposed within suitable openings provided in the headers such that incoming hot wet air from a compressor or the like passing through the inlet portion 20 will flow through the tubular members 40 from the inlet bonnet 22 to the outlet bonnet 32. The incoming air or gas may be at a pressure of approximately 125 p.s.i. since this is the usual outlet pressure from a conventional compressor plant.

The tubular members 40 are provided with a plurality of radial fins 42 disposed on the outer surface thereof and spaced along the length thereof. These fins are for the purpose of increasing the efficiency of heat transfer between the gas flowing through the tubular members and the gas which travels around the exterior of these tubular members as hereinafter explained.

A plurality of spaced baffles 44 are supported within the shell by suitable stay rods or the like, the baffles having openings therethrough tightly receiving the tubular members 40 extending therethrough. Each of the baffles closes off approximately one-half (½) of the cross-sectional area of the shell, and accordingly, gas traveling within the shell about the tubular members will be forced to follow a tortuous path in moving throughout the length of the shell 26.

A conduit portion 50 extends outwardly from the outlet bonnet 32 and is connected with one end of an L-shaped conduit portion 52 through the intermediary of flanges 50' and 52' extending radially from conduit portions 50 and 52 respectively and interconnected with one another in the usual manner as by nut and bolt assemblies (not shown).

The second heat exchanger means 12 is in fact an aftercooler and includes radially outwardly extending flanges 58 and 60 disposed at the opposite ends thereof. Flange 58 is secured to flange 52' in the usual manner, and a header is suitably clamped therebetween. In a similar manner, a header is clamped between the flange portions 60 and 61 at the opposite end of the second heat exchanger means, these latter flanges being suitably secured to one another.

Extending between the headers at the opposite ends of the aftercooler 12 are a plurality of spaced longitudinally extending tubular members 62 open at the opposite ends thereof and disposed within suitable openings provided in the associated headers.

A plurality of spaced baffle members 64 are disposed within the interior of the shell 56 and are provided with openings which tightly receive the tubular members 62 extending therethrough. It will be noted that in this instance the baffle members 64 may extend through an area of substantially more than half the cross-sectional area of the interior of shell 56.

An inlet portion 70 is connected with the interior of shell 56, and an outlet portion 72 is also connected with the interior of the shell. A suitable cooling medium such as water may be circulated through the interior of the shell about tubular members 62, the water being introduced at 70 and evacuated from the shell at 72. It is apparent that the water or the like will circulate through the shell in counterflow to the gas passing through the tubular members 62 so as to provide effective cooling of the gas passing through the tubular members to cause any vapor in such gas to be condensed.

Flange 61 is fixed to one end of a short length of conduit means 74 having a flange 76 at the opposite end thereof. Flange 76 is in turn suitably secured to a flange 78 extending outwardly from the inlet of the cyclone separator 14. This cyclone separator is of relatively conventional construction and employs the known principle of whirling the gases therewithin so as to remove the condensed vapors therefrom which pass outwardly from the separator at the lower portion thereof. The separator also includes an outwardly extending flange 80 extending about the outlet portion of the separator.

Flange 80 is suitably secured to a radially extending flange 82 fixed to one end of a curved conduit portion 84 which has flange 86 disposed at the opposite end thereof. Flange 86 is in turn suitably secured to a flange 88 extending outwardly from the outer open end of a tubular portion 90 which is formed integral with a hollow inlet portion 92 which comprises a bonnet or the like having a flange 94 extending outwardly therefrom and secured to a tube plate 96 which in turn is fixed to a substantially cylindrical shell portion 98 having a similar tube plate 100 fixed to the opposite end thereof. Tube plate 100 may in turn be suitably connected to a flange portion 102 extending outwardly from an outlet portion or bonnet 104.

A plurality of tubes 110 open at the opposite ends thereof are supported within counterbored openings 96' and 100' provided in the tube plates 96 and 100 respectively. The tubes are supported at intermediate portions thereof by tube support plates 112 having openings formed therethrough snugly receiving the tubes 110.

The tubes 110 are provided on the interior thereof with a suitable material for absorbing moisture from gas passing through the tubes, and as mentioned previously a deliquescent material such as lithium chloride or calcium chloride is employed. It is apparent that other materials as may appear on the market may be suitable for this purpose. As seen particularly in FIG. 3, the manner of providing the deliquescent material will be most clearly understood. As illustrated in this figure, porous ceramic discs 116 are affixed within the opposite ends of each of the tubes 110, and in a typical example these discs may be made by mixing sifted aluminum oxide grains or similar material held together in a porous state by a binder such as glass, the discs being fired in a kiln to cause the grains to be attached to one another at points of contact thereby developing a porous structure.

The deliquescent material held in place by the porous ceramic discs at either end of the tube may comprise granules of lithium chloride as indicated by reference numeral 118. It is apparent that the gas passing through the tube would tend to carry the lithium chloride granules along with it if they were not properly retained within the tubes by the discs 116. It is also apparent that the counterbored configuration of the openings in the tube plates will serve to prevent the discs from leaving the associated tubes.

Referring now to FIG. 4, one possible modification of the manner of providing the deliquescent material within the tubes is illustrated. As shown in this figure, a tube 110' is shown in cross section, and disposed within this tube is a section of paper or the like 122 which may be similar to corrugated paper and which is an impregnated treated paper which is first immersed in a liquid lithium chloride brine and then dried under a neutral gas high temperature process. The lithium chloride is then fairly impregnated in the paper and on the surface so as to come into intimate contact with the cold wet compressed air which passes through the tubes of the drier. It is apparent that this arrangement will also serve to provide a surface over which the air or gas can pass and wherein the deliquescent material is adapted to absorb moisture from such gas.

A conduit means 126 has one end thereof disposed in communication with the hollow interior of the outlet portion 104 of the drier means, the opposite end of conduit means being in communication with a fitting 128 connected with the shell 26 of the first heat exchanger means 10. With this construction, gas passing through tubes 110 will enter the hollow interior of outlet portion 104 and then pass through conduit 126 to the interior of shell 26 whereupon such gas will circulate about tubular members 40 and around the baffles 44 throughout the length of the shell 26 and thence outwardly through the outlet fitting 130 which is adapted to be connected with any suitable consuming apparatus.

The drier regenerating means of the present invention includes an inlet conduit means indicated generally by reference numeral 134 and including a short length of conduit 136 connected with the interior of shell 26 at point 138 and having a valve means 140 connected therein. This valve means may be operated to control the percentage of the hot dry clean compressed air which is withdrawn from the first heat exchanger adjacent the outlet portion 130 and which is recirculated through the tubes of the drying portion of the drier so as to regenerate the deliquescent material contained in the drying tubes. This valve means may be either manually or automatically operated and the operation thereof will be a function of the water vapor content of the intake air.

Conduit section 136 is provided with a radially extending flange 142 which is suitably connected with a flange 144 disposed at one end of an intermediate conduit portion 146. A modest quantity of hot, dry, clean, compressed air is required to be passed back through the drier tubes, and a low pressure blower 148 produces sufficient pressure to overcome friction loss within the system. This blower is in turn driven by a relatively small electric motor or other suitable driving means 150.

The gas passing through the inlet conduit means 134 of the regenerating means then passes downwardly through a swivel joint 154 and into the hollow interior of a central tubular portion 156 of a first movable means indicated generally by reference numeral 160.

As seen in FIG. 2, the central longitudinally extending tubular portion 156 of movable means 160 extends inwardly through a central flange portion 162 fixed to the central end portion of the inlet portion 92. This central flange portion 162 includes an annular recess which receives a pair of packings 164 which are adapted to provide a seal with the outer surface of tubular portion 156. The packings are retained in operative position by means of a flange 166 having a substantially L-shaped cross-sectional configuration as seen in FIG. 2 and which includes a plurality of holes 168 formed through the radially extending flange portion thereof.

Studs 170 which are threaded throughout the length thereof are each threaded at one end thereof within suitable threaded holes 172 provided in the flange portion 162. The studs each extend outwardly through one of the holes 168 provided in flange 166, and nuts 174 are threaded on the outer ends of the studs 170 for urging flange 166 toward the packing members 164 to compress the packings and to provide the desired seal.

Movable means 160 includes a pair of radially outwardly extending arm portions 178 and 180 which are disposed in communication with the central tubular portion 156 and fixed thereto. As seen in FIG. 2, an enlarged portion 182 is provided at the inner end of these arms and a wear plate 184 secured thereto. A compression spring 186 bears against wear plate 184 and against the inner surface of the flange 162 for urging the entire first movable means to the left toward the associated tube plate 96. Compression spring 186 is disposed about a cylindrical sleeve portion 188 which extends inwardly from the flange portion 162 as seen clearly in FIG. 2 of the drawings.

Arm portions 178 and 180 are provided respectively with longitudinally extending tubular portions 178' and 180'. Slidably disposed within these longitudinally extending portions are substantially cylindrical bronze bearing members 190 and 192. Member 190 is urged to the left against the associated tube plate 96 by a compression spring 194 which is seated against an inwardly extending shoulder portion 196 fixed to portions 178'. In a similar manner, cylindrical member 192 is urged to the left against the adjacent face of the associated tube plate by means of a compression spring 198 which bears against an inwardly extending shoulder portion 200 fixed to the inner surface of portion 180'.

The construction of these slidable bronze bearing sleeve members may be better understood from a consideration of FIG. 3 wherein a portion of the movable means at the opposite end of the drier means is illustrated, it being understood that the two movable means are substantially identical in construction. As seen in FIG. 3, an arm portion 210 includes a longitudinally extending portion 212 which corresponds with the portions 178' and 180' previously described.

The tubular bronze bearing member 214 corresponds to members 190 and 192 and is slidably disposed within portion 212, member 214 having an O-ring 216 disposed within an annular groove 218 formed in the outer surface thereof. Tubular member 214 is constantly urged to the right as seen in FIG. 3 by means of a compression spring 220 which seats against an inwardly directed shoulder portion 222 fixed to the inner surface of portion 212. It is apparent that the outer end of member 214 will be constantly frictionally urged against the adjacent face of the tube plate 100 to maintain a seal therewith.

Referring to the right hand portion of FIG. 1, a driven gear 230 is fixedly secured to the central tubular portion 156 of the rotating means 160. A pinion gear 232 is in driving meshing relationship with gear 230, gear 232 being driven by a speed reducer mechanism 234 which is drivingly connected with the motor 150. During normal operation of the apparatus, motor 150 is continuously driven at a predetermined speed so as to turn the rotating means 160.

It will be noted that the arm 178 does not extend outwardly as far as the arm 180. The tubes 110 within the drier are arranged in two circular rows which are concentric with one another. The inner circular row of tubes is adapted to be serviced by the arm 178, while the outer circular row of tubes is adapted to be serviced by the arm 180. In other words, as the rotating means 160 is rotated, the bearing sleeve portions 190 and 192 will come into alignment with various tubes in the different rows of tubes within the drier, the arrangement being such that the tubes will be regenerated in an orderly sequence. It is apparent that as the rotating means 160 rotates, it will successively come into communication with different ones of the tubes as it rotates, and the tubes accordingly will be regenerated in succession. This cycle will continuously repeat itself such that the apparatus is adapted to operate over extended periods of time.

A longitudinally extending hollow tubular portion 240 is rigidly affixed to rotating means 160 and extends within the central portion of the drier. Tubular portion 240 is drivingly interconnected with a similar tubular portion 242 through a splined driving connection indicated at 244. This splined driving connection permits member 240 to positively drive member 242 while permitting longitudinal expansion and contraction movements of these components.

Tubular member 242 is secured to the central portion of a movable means 246 the arm 210 of which has been previously described. It should be understood that the construction and operation of the movable means 240 is substantially identical with the movable means 160, and accordingly, it is not necessary to describe movable means 246 in detail.

It will be understood that arm 210 corresponds to the arm 178, and an arm 250 corresponds to the arm 180. A spring 252 corresponds to the spring 188, and it will be apparent that the movable means disposed within the outlet portion of the drier means is adapted to cooperate with the ends of the tubes in a manner similar to the movable means 160.

It will be noted that the arms of each of the movable means are similarly oriented such that the arms thereof are disposed in communication with the opposite ends of the same tube within the drier at any particular moment.

The movable means 246 includes a longitudinally extending tubular portion 260 similar to the portion 156 previously described. Portion 260 in turn is connected with a swivel joint 262 which is operatively connected to the one end portion of a conduit portion 264 having a flange 266 formed at the opposite end thereof. Flange 266 is in turn operatively connected in a suitable manner with a flange 268 fixed at the outer end of a conduit portion 270 which in turn is in communication with the conduit portion 52. With this arrangement, the gas which has passed through the drier tubes 110 then passes through the arms of the movable means 246 and thence back to the inlet portion of the second heat exchanger means or aftercooler 12.

OPERATION

During operation of the apparatus, motor 150 will be continuously driven in most applications so as to operate the blower 148 and to rotate the movable means 160 and 246.

Hot wet air from an air compressor or the like enters the apparatus through the inlet portion 20 and passes through the tubular members 40 of the first heat exchanger means 10. This gas passing through tubular members 40 loses some of its heat as it passes through the finned tubes due to the fact that the cold dry air from the drier means is passing around tubular members 40 during its travel from portion 128 to the outlet portion 130.

The wet air which is cooled somewhat in its passage through the first heat exchanger means 10 then passes into the second heat exchanger means 12 wherein it is substantially cooled due to the presence of the circulating cooling water about tubular members 62. A substantial portion of the vapors will be condensed during the travel of the gas through heat exchanger means 12.

The gas then passes into the cyclone separator 14 which operates in the usual manner to separate out the condensed moisture from the gas.

The gas then passes downwardly into the interior of the inlet portion 92 of the drier means and then passes through the drier tubes 110 wherein the deliquescent material serves to remove substantially all of the remaining moisture such that cold dry air emerges from the open ends of tubes 110 within the outlet portion 104. This cold dry air then passes back through conduit means 126 to the first heat exchanger means 10 whereupon it flows about the tubular members 40 and is heated so that it emerges from the discharge 130 of the apparatus in a heated expanded condition to provide hot dry gas to a suitable consuming apparatus.

During this drying operation as discussed above, the various tubes 110 of the drier apparatus are being continuously regenerated. Valve 140 is suitably adjusted so as to permit hot dry air to be drawn back through the inlet conduit means 134 by the blower 148 whereupon this hot dry gas is passed through the arms of the movable means 160.

This hot dry air then in sequence passes through different ones of the drier tubes 110. At any particular moment as illustrated in the drawing, the hot dry gas will be transmitted through a particular tube of the drier and will be conducted from the movable means 246 and conduit means 264 back to the second heat exchanger means 12.

It is apparent that the hot dry regenerating gas passing through the drier tubes will pick up a substantial portion of the moisture which has been absorbed by the deliquescent material so as to regenerate the deliquescent material. This moisture laden air then passes back to the second heat exchanger means where the moisture is condensed to a substantial degree and removed by the cyclone separator, any remaining moisture then being removed as such gas again passes through the drier tubes.

It is apparent from the foregoing that there is provided according to the present invention new and novel gas drying apparatus which is particularly adapted for use with air compressors and the like and which serves to remove water and oil vapor from hot compressed gas. The apparatus employs a combined mechanical and chemical action to remove vapor from the gas. Firstly, the incoming gas is cooled so as to condense the moisture which is removed by a mechanical means such as a cyclone separator, and then the gas passes over a suitable material such as a deliquescent substance to remove a still further portion of the moisture from the gas.

The cold dry air emerging from the drier means of the present invention is then heated so as to increase the volume of the purified gas to increase the over-all efficiency of the system. A continuous regenerating means is provided for regenerating the chemical drying substance employed in the apparatus. This regenerating means successfully accomplishes the intended purpose with no loss of energy or compressed air within the system and without requiring any outside source of heat. Additionally, the horsepower input to the system is reduced to a minimum since only a small motor is required to drive the blower means and the rotating means of the regenerating means. The over-all apparatus is quite simple and compact in construction, and yet at the same time is quite reliable and efficient in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Gas drying apparatus comprising first heat exchanger means, said first heat exchanger means defining a first fluid flow path and a second fluid flow path, a second heat exchanger means defining a third fluid flow path connected in communication with the first fluid flow path of said first heat exchanger means, separator means including an inlet and an outlet, said inlet being connected in communication with said third fluid flow path through said second heat exchanger means, drier means including an inlet portion and an outlet portion and having a drying portion connected between said inlet and outlet portions, the outlet of said separator means being connected in communication with the inlet portion of said drier means, said outlet portion of said drier means being connected directly with the second fluid flow path of said first heat exchanger means, said drying portion of the drier means including means for drying gas passing therethrough, and drier regenerating means for removing moisture from the drying portion of said drier means, said regenerating means being connected with the second fluid flow path of said first heat exchanger means and being adapted to circulate hot dry gas through the drying portion of said drier means.

2. Gas drying apparatus comprising first heat exchanger means defining a first fluid flow path and a second fluid flow path, an inlet means connected with said first fluid flow path and an outlet means connected with said second fluid flow path, second heat exchanger means defining a third fluid flow path connected in communication with the first fluid flow path of said first heat exchanger means, separator means including an inlet and an outlet, the inlet of said separator means being connected in communication with said third fluid flow path defined by said second heat exchanger means, drier means including an inlet portion and an outlet portion, a drying portion connected between said inlet portion and said outlet portion, the outlet of said separator means being connected with the inlet portion of said drier means, the outlet portion of said drier means being connected directly with the second fluid flow path of said first heat exchanger means, the drying portion of said drier means including means for removing moisture from gas passing through said drying portion, and drier regenerating means for removing moisture from said drying portion, said regenerating means including inlet conduit means connected with the second fluid flow path of said first heat exchanger means for transmitting hot dry gas back to said drying portion for removing moisture therefrom, said regenerating means also including an outlet conduit means connected with said third fluid flow path of said second heat exchanger means whereby moisture laden gas is transmitted back to said second heat exchanger means and thence to said separator means.

3. Gas drying apparatus comprising first heat exchanger means defining a first fluid flow path and a second fluid flow path, inlet means connected in communication with said first fluid flow path and adapted to receive hot wet gas, outlet means connected in communication with said second fluid flow path of said first heat exchanger means, second heat exchanger means defining a third fluid flow path connected in communication with said first fluid flow path of the first heat exchanger means, said second heat exchanger means also defining a fourth fluid flow path for receiving a cooling medium for cooling gas flowing through said third fluid flow path defined by said second heat exchanger means, separator means for separating vapor from gas and including an inlet and an outlet, said inlet being connected in communication with said third fluid flow path of said second heat exchanger means, drier means including an inlet portion and an outlet portion and a drying portion connected between said inlet and outlet portions of the drier means, the outlet portion of said drier means being connected directly with the second fluid flow path of said first heat exchanger means, the outlet of said separator means being connected in communication with the inlet portion of said drier means, said drying portion including a plurality of spaced tubular members having a drying substance disposed therewithin for removing moisture from gas passing therethrough, said tubular members opening at the opposite ends thereof into said inlet and outlet portions respectively, and drier regenerating means for removing moisture from said substance disposed within said tubular members, said regenerating means including movable portions adjacent said inlet and outlet portions and being adapted to be in communication with different ones of said tubular members in sequence, means for moving said movable portions into communication with said tubular members, an inlet conduit means connected in communication with one of said movable portions disposed adjacent the inlet portion of said drier means, said inlet conduit means being connected in communication with said second fluid flow path of said first heat exchanger means, and outlet conduit means connected in communication with the movable portion adjacent the outlet portion of said drier means, said outlet conduit means being connected in communication with said third fluid flow path of said second heat exchanger means.

4. Apparatus as defined in claim 3 including blower means connected in said inlet conduit means for forcing air from said second fluid flow path of said first heat exchanger means to said movable portion adjacent the inlet portion of said drier means.

5. Apparatus as defined in claim 4 wherein said inlet conduit means is connected with the second fluid flow path of said first heat exchanger means adjacent the outlet of said first heat exchanger means so as to assure that hot dry gas will be recirculated from said first heat exchanger means back through the tubular members of the drying portion of the drier means for regeneration purposes.

6. Apparatus as defined in claim 3 wherein said means for moving said movable portions includes a drive means, one of said movable portions extending outwardly of said drier means and being connected with said drive means, and means operatively interconnecting the movable portions adjacent said inlet and outlet portions of the drier means such that said movable portions move in unison.

7. Apparatus as defined in claim 3 wherein said tubular members are arranged in spaced relationship about a central axis of the drier means so as to define a first circular row of tubular members and a second concentric circular row of tubular members therearound, each of said movable portions including a pair of radially outwardly extending arms each of which is of tubular construction and which terminates in a longitudinally extending portion, and resiliently urged means disposed within each of said longitudinally extending portions for assuring a sealing relationship with the adjacent open ends of said tubular members.

8. Gas drying apparatus comprising first heat exchanger means, said first heat exchanger means defining a first fluid flow path and a second fluid flow path, an inlet means connected with said first fluid flow path, said first fluid flow path being constructed to conduct fluid to said first heat exchanger means in only one direction, said second fluid flow path being constructed to conduct fluid through said first heat exchanger means in only one direction counter to the direction of flow of fluid through said first fluid flow path, outlet means connected with said second fluid flow path of said first heat exchanger means and being disposed adjacent said inlet means of the first heat exchanger means, second heat exchanger means defining a third fluid flow path connected in communication with said first fluid flow path of the first heat exchanger means, said second heat exchanger means defining a fourth fluid flow path for receiving a cooling medium for cooling gas flowing through said third fluid flow path of the second heat exchanger means, separator means for separating vapor from gas and including an inlet and an outlet, said inlet of the separator means being connected in communication with the third fluid flow path through said second heat exchanger means, drier means including an inlet portion and an outlet portion, said inlet portion and outlet portion comprising hollow chambers, said drier means including a drying portion intermediate said inlet portion and said outlet portion and separated from said inlet and outlet portions by tube plates, said drying portion including a plurality of tubes supported between said tube plates and being open at opposite ends thereof with each of said tubes opening into said inlet portion at one end of the tubes and into said outlet portion at the other end of the tubes, each of said tubes having a substance disposed therein for removing moisture from gas passing through the tubes, and regenerating means for said drier means, said regenerating means including a first movable portion disposed within said inlet portion of the drier means and a second movable portion disposed within the outlet portion of said drier means, each of said movable portions including a central longitudinally extending tubular portion and a pair of radially outwardly extending tubular arms which terminate in longitudinally extending tubular portions, means slidably disposed within each of said last-mentioned longitudinally extending tubular portions, and resiliently urged toward the adjacent tube plate to provide a seal therewith, resilient means urging said arms toward the associated tube plates, an inlet conduit means connected with the central tubular portion of said first movable means and being connected with the second fluid flow path of said first heat exchanger means adjacent the outlet of said first heat exchanger means, an outlet conduit means being connected with the central tubular portion of said second movable means and being connected in communication with the third fluid flow path through said second heat exchanger means remote from said separator means, means drivingly interconnecting said first and second movable portions for movement in unison with one another, and driving means drivingly interconnected with one of said movable portions for moving the movable portions so as to bring the arm portions thereof into communication with different ones of said tubes in a sequential operation.

9. Apparatus as defined in claim 8 wherein the substance within each of said tubes comprises a deliquescent material.

10. Apparatus as defined in claim 8 wherein said inlet conduit means and said outlet conduit means are connected with said central portions of the first and second movable portions of the regenerating means respectively through the intermediary of swivel joint connections.

11. Apparatus as defined in claim 8 including blower means operatively connected in said inlet conduit means for urging hot dry air from the second fluid flow path of said first heat exchanger means to said first movable portion of the regenerating means.

References Cited by the Examiner
UNITED STATES PATENTS

| | | | |
|---|---|---|---|
| 2,759,560 | 3/1953 | Miller | 55—33 |
| 2,882,998 | 4/1959 | Grenier | 55—27 X |
| 3,205,638 | 6/1963 | Hagle | 55—180 X |

REUBEN FRIEDMAN, *Primary Examiner.*

R. W. BURKS, *Assistant Examiner.*